United States Patent

Purvey

[11] Patent Number: 5,906,733
[45] Date of Patent: May 25, 1999

[54] LIQUID CLEANING SYSTEM INCLUDING BACK-FLUSHING FILTER AND CENTRIFUGAL CLEANER THEREFOR

[75] Inventor: Ronald J. Purvey, Axminster, United Kingdom

[73] Assignee: The Glacier Metal Company Limited, United Kingdom

[21] Appl. No.: 08/875,613

[22] PCT Filed: Jan. 23, 1996

[86] PCT No.: PCT/GB96/00125

§ 371 Date: Jul. 31, 1997

§ 102(e) Date: Jul. 31, 1997

[87] PCT Pub. No.: WO96/23590

PCT Pub. Date: Aug. 8, 1996

[30] Foreign Application Priority Data

Feb. 2, 1995 [GB] United Kingdom ............... 9502055

[51] Int. Cl.⁶ .................................................. B01D 29/66
[52] U.S. Cl. ........................ 210/100; 210/108; 210/167; 210/295; 210/323.2; 210/323.01; 210/411; 210/416.1; 494/5; 494/24
[58] Field of Search .................................. 210/108, 295, 210/323.2, 333.01, 333.1, 411, 100, 167, 168, 416.1; 494/5, 24, 28, 29, 30

[56] References Cited

U.S. PATENT DOCUMENTS

| | | | |
|---|---|---|---|
| 2,858,941 | 11/1958 | Darnell | 210/295 |
| 3,784,092 | 1/1974 | Gibson | 233/20 R |
| 3,791,576 | 2/1974 | Bazil | 233/19 R |
| 3,907,686 | 9/1975 | Fletcher et al. | 210/259 |
| 4,352,739 | 10/1982 | Oliver, Jr. et al. | 210/739 |

FOREIGN PATENT DOCUMENTS

| | | |
|---|---|---|
| A 136202 | 7/1984 | European Pat. Off. . |
| A 606 578 | 7/1994 | European Pat. Off. . |
| A 1329203 | 9/1973 | United Kingdom . |
| 2160796 | 1/1986 | United Kingdom . |
| WO 83/02406 | 7/1983 | WIPO . |
| WO 92/16303 | 10/1992 | WIPO . |

Primary Examiner—Peter A. Hruskoci
Attorney, Agent, or Firm—Nixon & Vanderhye P.C.

[57] ABSTRACT

A liquid cleaning system, which includes a barrier type filter having a back-flush arrangement for recovering filter contaminants from the back-flushed liquid which is available only at a low, not necessarily consistent, rate, includes a fluid-powered centrifugal cleaner which, in addition to the normal shaft-mounted rotor through which liquid is passed to separate contaminants centrifugally due to rotor speed, includes fluid drive means in the form of fluid reaction drive nozzles supplied with pumped liquid from the system as a drive fluid to rotate the rotor at a speed above the minimum to effect centrifugal separation of the contaminants from the back-flushed liquid in the rotor and accumulation of the outlet of the rotor. The spent drive fluid mixes with the cleaned back-flushed liquid in a discharge region and both may be re-used in the system. The intermittently available cleaned liquid may emerge from the rotor by conventional fluid reaction nozzles and supplement the reaction of the drive nozzle means. Control valve means permits the rotor to be removed whilst liquid flows in the system.

9 Claims, 2 Drawing Sheets

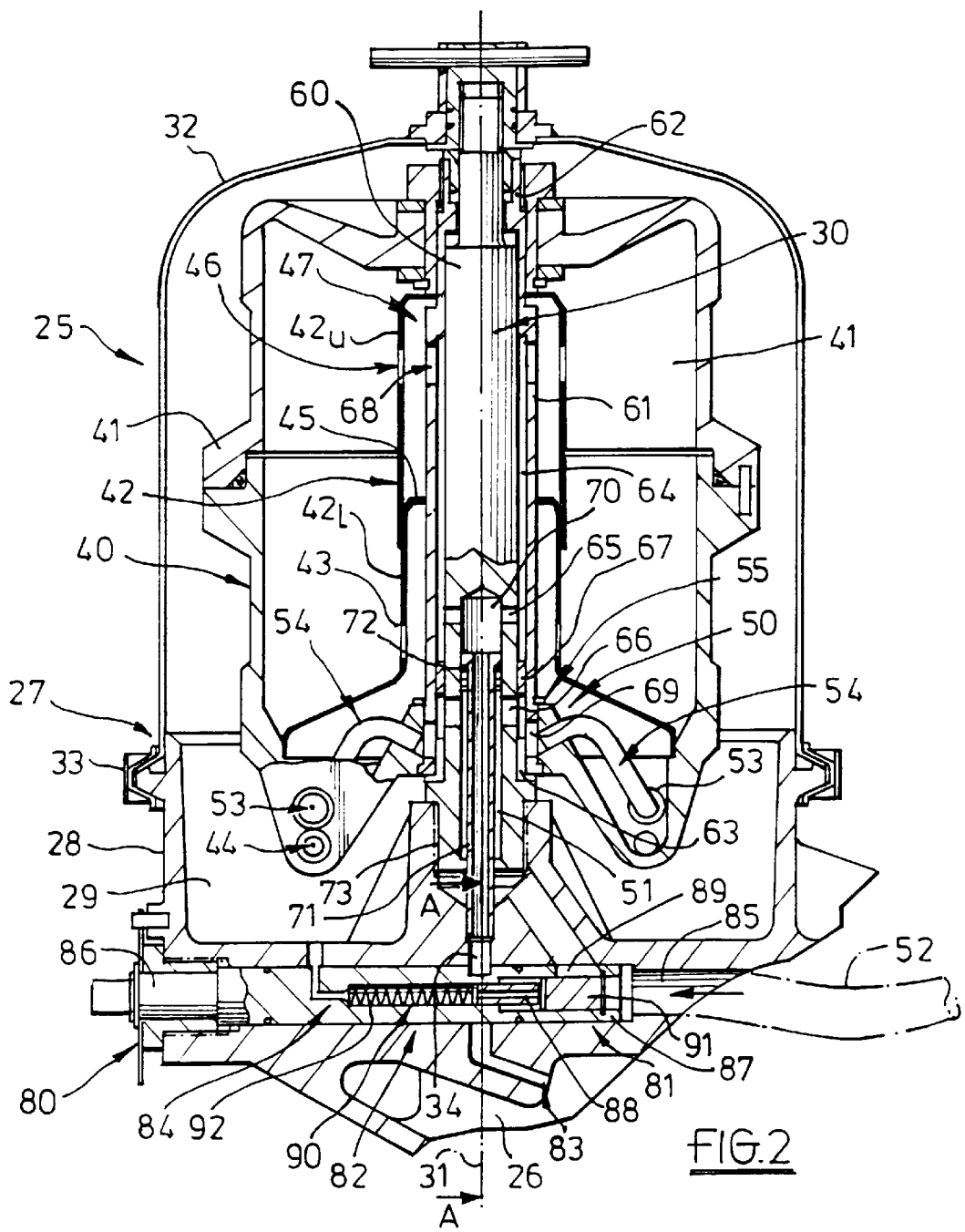
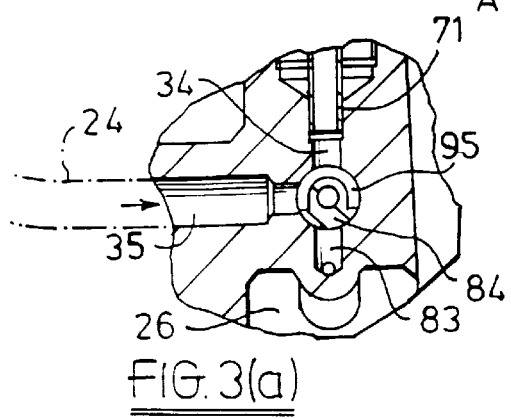 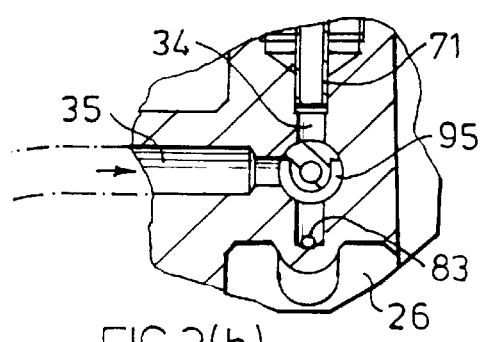
FIG.2
FIG.3(a)  FIG.3(b)

LIQUID CLEANING SYSTEM INCLUDING BACK-FLUSHING FILTER AND CENTRIFUGAL CLEANER THEREFOR

This application is a 371 of PCT/GB96/00125, filed Jan. 23, 1996.

BACKGROUND AND SUMMARY OF THE INVENTION

The invention relates to liquid cleaning systems of the type in which a liquid is pumped around the system by way of a self-cleaning, barrier filter of the so-called back-flush type, and in particular relates to the incorporation of a fluid-powered centrifugal cleaner to process the contaminated liquid back-flushed from the barrier filter.

Self-cleaning barrier filter units are well known in the art in which a housing contains a plurality of filter elements or discrete surface regions each having an inlet surface exposed to a common inlet chamber of the pumped fluid and an opposite, outlet, surface exposed to a common outlet chamber in which the filtrate, the cleaned fluid, is collected before leaving the unit still under pressure. In addition, the inlet chamber has a shield or cover member which is operable periodically to isolate each inlet surface in turn from the inlet chamber and connect it instead to a rejection conduit which leaves the housing, so that as the shield member moves from element to element the temporarily shielded element is subject to reverse flow from the outlet chamber which serves to lift contaminant debris from the inlet surface of the element and flush it along the rejection conduit.

Such self cleaning barrier filter units may operate in a so-called intermittent manner, in which the shield or cover member moves only occasionally between inlet surface regions, and possibly limiting flow through the inlet surface region for a predetermined interval less than the total time it serves that region and/or whilst it is changing between inlet surface regions, or so that the flow of back-flushed liquid is more continuous but from a continuously varying, and frequently cleaned, region of inlet surface.

Whereas it is conventional in full flow or barrier filter design that each filter unit passes liquid with minimum pressure difference across it (subject of course to having a pore size to trap particles of the required dimensions), it is found that to efficiently flush such trapped contaminant particles from a filter requires a large pressure difference to be available to establish a high flow rate through the filter and carry them from the inlet surface region. However, if the filter element should become significantly or completely blocked to liquid passage, possibly over a period of time by inefficient flushing of the contaminants, the prolonged and repeated application of significant pressure difference across the filter region risks effecting physical damage to the underlying structure of the pressure filter in that region.

Thus it is important to the operating life of the filter unit that the back-flushing removes contaminants from the back-flushed region efficiently and without permitting a progressive accumulation.

Most simply the back-flushed liquid, despite the high concentration of contaminants, is returned directly to the reservoir from where it is subsequently pumped around the system and the solid contaminants are again held by the barrier filter. Whereas such an arrangement ensures the contaminants are contained in the system between the reservoir and barrier filter, the liquid in the reservoir does become progressively more contaminated.

As indicated above, a conventional full-flow or barrier type filter element normally intends to produce a relatively small pressure drop across it as liquid flows therethrough and it is known to interpose such a further barrier filter between the back-flush arrangement and the reservoir to isolate solid contaminant without significantly reducing the pressure difference applied across the back-flushed region of the filter.

However, such further barrier filter whilst having of necessity a significant surface area, is capable only of trapping a relatively small volume of contaminants and therefore is necessarily coarse if it is not to become blocked in a very short time. In practice therefore, such filters serves only to trap large particles whilst permitting small particles of soot etc to remain in the liquid. Notwithstanding the efficacy of such a further filter or dependence upon pore size, it is still liable to require cleaning frequently to avoid introducing a significant pressure difference to the back-flush arrangement; to avoid closing down the system, which would negate any advantage from the back-flush arrangement in the barrier filter, it is considered a practical necessity to have at least two such further filters in a duplex arrangement so that one operates whilst the other is cleaned or replaced.

An example of such a barrier type filter having back flush arrangement is disclosed in EP-A1-136202.

It will be appreciated therefore that such form of filtering of back-flushed liquid involves capital and maintenance costs which may not be justified for all systems, particularly in view of the limited range of solid contaminants removed thereby.

Within a liquid circulation system including such a barrier type filter, it is known to complement the filter, which traps contaminant particles on the basis of size alone and has limited capability to hold such contaminants, with a centrifugal cleaner in which contaminant particles are separated on the basis of mass rather than size (although they are related for any particular substance) and which has the capacity to hold a significant volume of separated contaminants.

Typically, within a centrifugal cleaner a substantially vertically-mounted, high speed rotor includes a contaminant-depositing container, (more conveniently referred to simply as a contaminant container) through which the fluid is passed and in which solid contaminants are separated from the fluid to deposit on the container wall from which they can be periodically removed or the container replaced. Such a centrifugal cleaner may have its rotor driven by external coupling to an engine or like rotary plant with which used, which results in a complex and expensive arrangement, or may, as is more usual and considerably cheaper to implement, be driven by causing the fluid applied to the contaminant container under pressure to exit by way of tangentially directed nozzle means, the reaction to which spins the rotor at high speed essential for efficient centrifugal separation. Such a fluid-cleaner, in which the rotor is driven by the fluid being cleaned, is usually referred to as a self-powered centrifugal cleaner.

In such a self-powered centrifugal cleaner the liquid loses all energy in passing through the container, so that it has invariably been used in a by-pass mode, tapping liquid from a relatively high pressure part of the system in the vicinity of the full flow filter and returning it directly to the reservoir.

The use of such self-powered centrifugal cleaner in combination with a barrier type filter is disclosed in EP-A-0606578, the barrier type filter delivering a constant supply of liquid, some of which may be diverted through the centrifugal cleaner to by-pass the rest of the circulation system.

It is implicit in such self-powered centrifugal cleaners that reaction nozzle means must be dimensioned to create a significant pressure difference thereacross to rotate the contaminant container at a speed high enough to affect centrifugal separation and also that the pressure and rate of supply of the liquid and be adequate to effect continuous high speed rotation or separation will not be efficient.

As an alternative to self-powered centrifugal cleaning, wherein all of the fluid is both subjected to centrifugal cleaning within the contaminant chamber and creates rotation of the chamber by its ejection therefrom, it is known to split liquid supplied at uniformly high pressure into two streams, one to serving only to spin the contaminant chamber and the other to pass through for cleaning. Such arrangement is described in U.S. Pat. No. 3,791,576 and U.S. Pat. No. 3,784,092 which each discloses a centrifugal cleaner in which a liquid stream pumped from a reservoir at constant pressure is split so that part of it drives the centrifugal separation rotor and part of it entrains a dissimilar liquid, floating on the reservoir, into the separation rotor where the pumped and entrained liquids can be separated from the mixture along with any solid contaminants from the stream which are isolated and contained.

However, in relation to back-flushing liquid from a barrier type filter, consideration of employing such an alternative cleaning mechanism to a barrier-type filter becomes unattractive not only because of the potentially relatively low supply pressure and rate and consistency of liquid supply, after passing through two lower type filter regions in series, but more significantly because the pressure drop across the contaminant container, whether able to rotate or not, significantly limits that available across the barrier filter region for back-flushing to the extent that it may not clean completely and accumulation of contaminants occur. If complete blockage of the filter region were to occur, such that there is in effect no pressure drop across the centrifugal cleaner, when the filter region is subsequently exposed to back-flushing pressure, the aforementioned high and potentially damaging pressure difference across the region could occur.

Therefore cleaning back-flushed contaminated liquid by way of conventially employed barrier-type or self-powered centrifugal cleaning devices has not been perceived as an efficient cost effective activity.

It is an object of the present invention to provide a liquid cleaning system, including pump means and a barrier type filter having an intermittent back-flush arrangement, in which the heavily contaminated back-flushed liquid is cleaned efficiently and simply by centrifugal cleaning.

According to a first aspect of the present invention, a liquid cleaning system comprises pump means, operable to cause liquid to flow through the system, a barrier type filter having a back-flush arrangement whereby a proportion of the liquid after passage through the filter barrier can be passed in a reverse direction through a region of said barrier, and a fluid-powered centrifugal cleaner including a rotor having a contaminant chamber through which the back-flushed liquid is passed and rotor drive means responsive to consistently supplied fluid, separate from the back-flushed liquid, to effect rotation of the rotor about a substantially vertical axis at at least a minimum speed required to effect centrifugal separation of solid contaminants from back-flushed liquid passing through the contaminant chamber.

An embodiment of the present invention will now be described by way of example with reference to the accompanying drawings.

BRIEF DESCRIPTION OF THE DRAWING

FIG. 2 is a sectional elevation through the fluid driven centrifugal cleaner of FIG. 1, and FIG. 3(a) and 3(b) are cross sections through the base of the cleaner of FIG. 1 taken in the direction A—A and illustrating operation of the control valve thereof, in first and second positions which direct the back-flushed liquid through the cleaner or to by-pass it respectively.

DETAILED DESCRIPTION OF THE DRAWING

Figure 1:
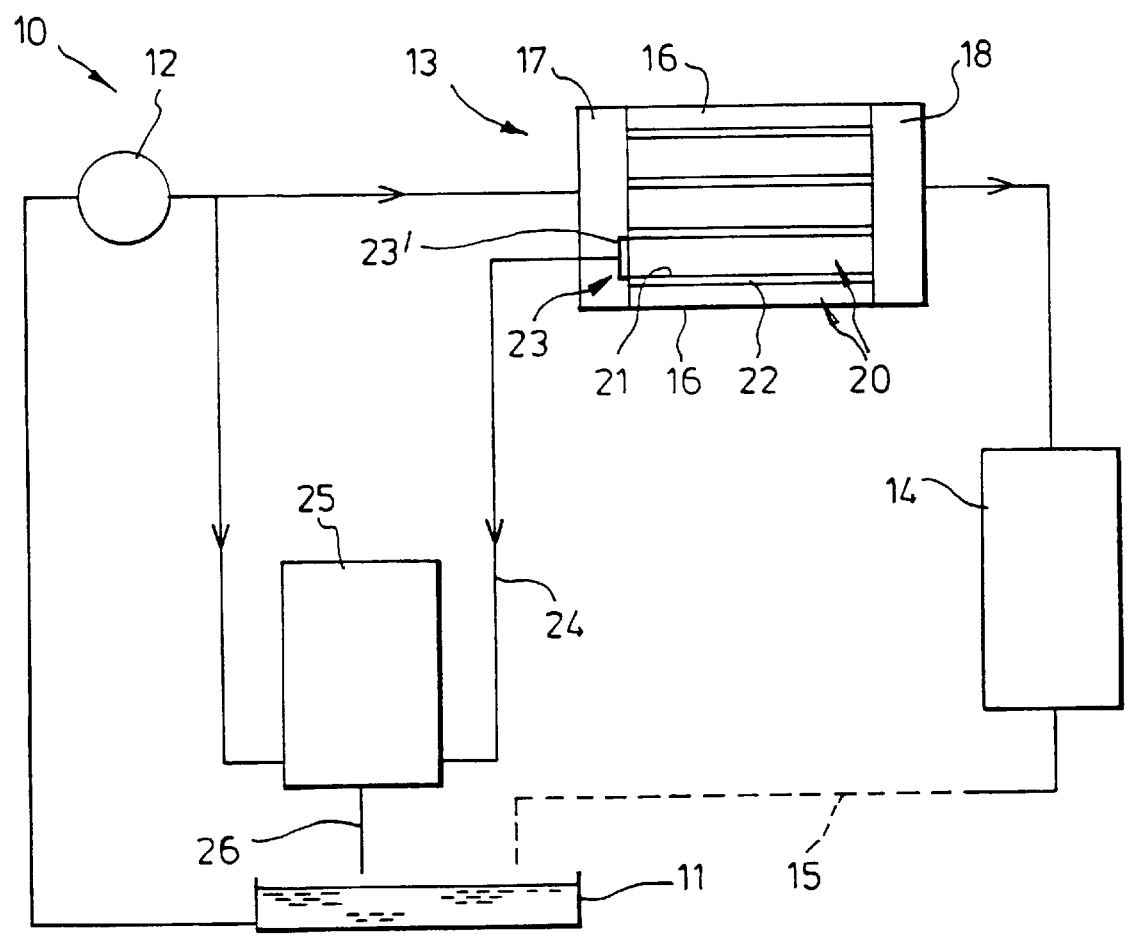
FIG. 1 is a schematic representation of a liquid cleaning system including pump means and barrier filter having an intermittent back-flush arrangement and in accordance with the present invention including a fluid driven centrifugal cleaner for the back-flushed liquid, driven by system liquid provided by the pump means.

Referring to FIG. 1, a liquid cleaning system 10 comprises a reservoir 11 of the liquid, pump means 12, a barrier or full-flow type filter 13, utilisation means 14 for the liquid, and a return 15 for utilised liquid to the reservoir.

The filter 13 is of a type having an intermittent back-flush arrangement substantially as outlined above, comprising a housing 16 containing inlet and outlet chambers 17 and 18 respectively and a plurality of filter elements 20 each comprising screens of metal mesh having what may be termed an inlet surface 21, exposed to the inlet chamber 17, and an opposite or outlet surface 22 exposed to the outlet chamber 18. Thus pumped liquid enters the inlet chamber, passes through each filter element from inlet surface to outlet surface and collects in the outlet chamber before exiting to the utilisation means. The housing also includes and intermittent back-flush arrangement 23 represented by a shield or cover 23' which is caused to move by an indexing mechanism (not shown) to close off each filter element 20, or its inlet surface 21, in turn from the inlet chamber whilst leaving outlet surface 22 exposed to the outlet chamber pressure. The shield 23 includes a rejection conduit 24 by which liquid from the closed off element is removed from the housing by liquid from the outlet chamber as pressure being flushed through the filter element in the reverse direction from outlet to inlet surface and, in doing so, entraining contaminants previously deposited on the inlet surface. It is known in the art that it is desirable for the pressure difference across the filter element during back-flushing to be as large as possible.

Normally such heavily contaminated back-flushed liquid is returned to the reservoir or further full-flow filter but in accordance with the present invention it is supplied to a fluid-powered centrifugal cleaner 25 which forms part of the system and effects separation of solid contaminants from the entraining liquid, permitting the latter to be returned to the system by way of duct 26 and reservoir 11.

Referring now to FIG. 2, the centrifugal cleaner 25 comprises a housing, indicated generally at 27, having a base 28 defining a discharge region 29 coupled to the reservoir 11 by way of passage 26 the latter being of such cross-sectional area and slope as to facilitate drainage by gravity when the ambient pressure within the drainage region is normal atmospheric pressure. The base supports spindle means 30 extending from the base along an operably vertical axis 31 through the housing, the spindle means supporting at its other end a relatively thin cover 32 which extends axially to abut the base at joint 33 and is removable from the base.

The spindle means contains a main inlet passage 34 extending part way therealong connected, by way of inlet duct 35 (FIG. 3(a)) in the base, to rejection conduit 24 to receive back-flushed liquid.

The housing further includes a rotor 40, supported on the spindle means for rotation thereabout, comprising an annular contaminant chamber 41 apertured and in communication with the discharge region 29 by way of a lower part 42$_L$ of a stand tube 42 apertured at 43, and nozzle means 44 comprising a plurality of substantially tangentially directed nozzles (also indicated as 44) arrayed about the axis 31. The stand tube 42 comprises a radially inner wall of the contaminant container 41 and an upper part 42$_U$ of the tube separated from the base part by septum 45 is apertured at 46 and in communication, in a manner to be described more fully hereafter, with the main inlet passage 34 by way of a main rotatable fluid coupling shown generally at 47.

The centrifugal cleaner as thus far described is conventional except insofar as the nozzle 44 may be dimensioned to offer a relatively small pressure drop for liquid passing therethrough, as opposed to a relatively large pressure drop conventionally required to effect high speed rotation of the rotor by reaction to liquid ejection from the nozzles. The nozzle dimensions may create some pressure drop in the ejected liquid that exerts force on the rotor by reaction to liquid ejection, although it may not be sufficient on its own and in response to the inconsistent supply of liquid to effect high speed rotation, and in that sense the nozzle means (and nozzles) 44 may be referred to as liquid reaction nozzle means and nozzles respectively.

In accordance with the invention the centrifugal cleaner also includes fluid operated drive means, indicated generally at 50. This drive means comprises a first part fixed with respect to the housing, in the form of an auxiliary inlet passage 51 associated with the spindle means and extending at least part way along the spindle means and through the base and connected to receive a supply conduit 52 to receive drive fluid at super-ambient pressure, (the ambient pressure of the discharge region being considered as ambient), being system liquid from the pump means 12. The drive means also comprises a second part comprising fluid reaction nozzle drive means 53 comprising a plurality of substantially tangentially directed drive nozzles (also indicated as 53) carried by the rotor and opening to the discharge region 29, a plurality of drive conduits 54 individually connecting the drive nozzles 53 to the auxiliary inlet passage 51 by way of an auxiliary rotatable fluid coupling 55. The drive nozzles 53 are conveniently contained in a lower wall of the contaminant container adjacent the liquid reaction nozzles 44, the associated drive conduits extending through the contaminant chamber thereto.

The fluid drive means thus receives a consistent, and conveniently constant, supply of relatively uncontaminated liquid from the pump means at a rate and pressure regulated by the pump means and/or the dimensions of any of conduit 52, inlet passage 51, conduit means 54 or drive nozzle means 53, and is response to ejection of the pumped liquid by way of the drive nozzle means 53 to rotate the rotor at at least the minimum speed to effect centrifugal separation of solid containments from the back-flushed liquid passing through the contaminant container 41. The back-flushed liquid, insofar as it periodically has a super-ambient pressure, may react against the nozzle means 44 on ejection therefore to supplement the reaction on the rotor from drive nozzle means 53 and provide supplementary reaction nozzle means which serves to increase the rotation rate and thus efficiency of contaminant separation.

Although a proportion of the pumped liquid is used by the drive means after which it is returned from the discharge means to the reservoir (or further cleaning operation) with the centrifugally cleaned, back-flushed liquid, the drive nozzle means is dimensioned such that only a relatively small proportion of the pumped liquid used as the drive fluid is prevented from reaching the utilisation means 14 and readily compensated for, if necessary, by slightly increasing the output pressure and/or delivery rate of the pumping means.

It will be appreciated that the conceptually simple provision of the fluid drive means may be implemented in the centrifugal cleaner in many ways, of which that shown in FIG. 2 is only one, but the manner in which the drive fluid (pumped liquid) is supplied from the stationary auxiliary inlet passage 51 to the rotating conduit means 54 in addition to the supplying back-flushed liquid to the contaminant container is of practicable significance.

Considering the spindle means 30 more closely, it comprises, static spindle 60. The rotor 40 includes a bearing tube 61 journalled to the spindle at 62 and 63 towards each end thereof and defining between the journals an annular tube space 64. The spindle has formed therein said main and auxiliary inlet passages which communicate with the annular tube space by way of main and auxiliary radial aperture means 65 and 66 respectively separated from each other in the axial direction. Each aperture means may comprise one or more apertures arrayed around the spindle. Tube seal means 67 extends between the bearing tube and the spindle at an axial position between the main and auxiliary radial aperture means to separate the tube space into discrete main (upper) and auxiliary (lower) regions respectively. The bearing tube is apertured in the main region at 68 to communicate with the contaminant chamber 41, by way of stand tube upper region 42$_U$ and aperture 46, and is apertured in the auxiliary region at 69 to communicate with individual drive conduits 54, thereby providing said main and auxiliary rotatable fluid couplings 47 and 55 respectively.

The main and auxiliary inlet passages conveniently are formed in a blind recess 70, extending from the end of the spindle supported on the base 28, in which the passages are defined coaxially one within the other.

The recess extends at least as far as the main radial aperture means 65 furthest from the base and contains a pipe 71 of smaller cross-sectional area which extends axially to a position between the main and auxiliary radial aperture means at which it is sealed at 72 to the spindle to define the main inlet passage within the pipe and recess (communicating with the radial aperture means 65) and the auxiliary inlet passage surrounding the pipe (communicating with the other radial aperture means 66).

It will be appreciated that by adopting such a structure for the (hollow tube or drilled) spindle means, a spindle within a conventionally journalled bearing tube that provides a contaminated liquid inlet for the rotor of a conventional self-powered centrifugal cleaner may be readily adapted to provide an auxiliary inlet passage whilst avoiding any orientation problems in aligning the passage within the spindle with continuations thereof in the base, permitting the spindle to be simply secured to the base by a screw thread 73.

It will be appreciated that a principal reason for employing such a barrier filter having a back-flush capability is to operate the system for a prolonged interval without the necessity to stop it for removing contaminants from the surfaces of the filter element screens. In accordance with the present invention the centrifugal cleaner has associated therewith control valve means which is operable to facilitate removal of the rotor with its contaminant container during continued operation of the system and barrier filter, that is, contemporaneously with the supply of liquid and drive fluid to the centrifugal cleaner.

The housing 27 contains within the base 28 thereof control valve means 80 comprising a drive fluid part 81, operable to pass or impede the passage of drive fluid to the auxiliary input passage 51 and a 'back-flushed liquid' part 82, operable in conjunction with the part 81 to divert the flow of back-flushed fluid received in duct 35 from the main inlet passage 34 to the discharge region 29 by way of passage 26 leading from discharge passage 83.

The parts 81 and 82 of the control valve means are defined by a single valve body 84 extending through an aperture 85 in the housing base to which supply conduit 52 is coupled. One end 86 of the valve body protrudes from the aperture, permitting it to be rotated about its longitudinal axis, whereas the other end 87 extends to a part of the aperture which comprises an extension of the aforementioned supply conduit 52 for receipt of drive fluid and beyond the junction of the aperture with inlets passage 51.

The valve body end 86 has a recess 88 extending axially from the end to receive drive fluid from supply conduit 36 and a lateral aperture 89 to pass it to inlet passage 51 or block its passage, depending upon the orientation of the valve body about its axis, defining thereby a drive fluid part of the control valve means. The valve body also includes a cut-off valve 90 comprising a piston 91 extending along the recess and biased by spring 92 towards the recess end 86 to isolate the lateral aperture 89 from received drive fluid irrespective of the orientation of the valve body. The cut-off valve is responsive to drive fluid pressure in excess of the predetermined minimum acting thereon to be displaced against the bias to permit the drive fluid to exit lateral aperture 89 to the auxiliary input passage, that is, the centrifugal cleaner only takes drive fluid from the system when pump delivery pressure is sufficient to sustain its loss.

Referring also to FIGS. 3(a) and 3(b) the valve body 84 also has a groove 95 extending part way about its periphery that defines a recess between the body and the aperture wall such that in a first rotational position of the valve body, wherein the lateral aperture 89 is aligned with inlet passage 51, the groove 95 is disposed to connect back-flushed liquid receiving ducts 35 and main inlet passage 34 whilst blocking drain passage 83. When the valve body is rotated to close the ducts 34 and 35 from each other, isolating the auxiliary inlet passage from the drive fluid, the groove 95 directs back-flushed liquid to the discharge region by way of drain passage 86 and isolates the main inlet passage, thereby permitting the housing to be opened and the rotor 41 to be removed without stopping liquid flow through the system. It will be appreciated that whilst the centrifugal cleaner is isolated, any heavily contaminated back-flushed liquid is discharged directly to the discharged region and may find itself returned to the reservoir. Although such contaminants will eventually be trapped by the barrier filter and removed by the centrifugal cleaner when it is subsequently operating, even such occasionally presented contaminants, and the back-flushed liquid bearing them, may be eliminated from the system by the discharge duct 83 discharging outside of the system, to waste, rather than the drainage region 26 which feeds to the reservoir.

It will be appreciated that numerous variations may be made in respect of the structural details of the above described fluid-powered centrifugal cleaner without departing from the scope of the invention.

For example, the control valve means may take different form such as a spool valve, be disposed separately from the housing or be omitted altogether.

The first and second parts of the drive means may also take the form other than described above in detail. For example, the first part may comprise an auxiliary inlet passage other than extending coaxially surrounding the main inlet passage defined by a central recess in a static spindle.

A unitary static spindle extending from the base and/or housing cover opposite thereto may have main and auxiliary inlet passages extending side by side from the same end, or from opposite ends, or may be a pair of stub spindles extending one each from the base and housing cover. Although it is convenient to define the auxiliary passage within a spindle, it may additionally be defined within the base and an annular passage space surrounding the spindle that comprises rotatable coupling means of the second part. Depending upon how the inlet passages are defined, the main radial aperture means may be the lower, rather than upper, aperture if liquid is to enter the contaminant container towards the lower end thereof, possibly if the exit is by way of reaction nozzles at the upper end of the rotor.

The second part of the drive means may therefore have conduit means 54 receiving drive fluid from the spindle means at any axial position and extend to drive nozzle means at any axial and radial position with respect to the rotor. Such drive nozzle means need not comprise a vertically disposed arrangement in a section of the base of the rotor, that is, extending through the wall of the contaminant container from a conduit within, but may comprise a simple nozzle defining the end of drive conduit means that extends outside of the contaminant container.

The fluid reaction drive nozzle means need not be fixed with respect to the rotor, provided it is coupled in respect of rotation about the axis to cause the rotor to rotate with it.

As an alternative to supplying fluid to drive nozzle means outside of the contaminant container by way of conduit means and a rotatable coupling means which defines an annular chamber surrounding the axis, such an annular chamber may extend radially, to a distance from the axis at which the reaction nozzle means may be defined in the walls thereof, for efficient rotation of the rotor contaminant container coupled thereto; that is, the rotatable coupling means may comprise a container for the fluid similar to the contaminant container and disposed in line with, or possibly inside of, the latter.

Notwithstanding the structure of the drive reaction nozzles 53 they need not be disposed at the same rotational positions as nozzles (44) for the cleaned back-flushed liquid, nor in vertical alignment therewith, provided the tangential direction which produces rotation is maintained.

The drive means, as described hereinbefore functions by ejecting fluid from nozzles means which is free to rotate about the axis as a reaction to ejecting the fluid. It will be appreciated that in an alternative form the rotor may be associated with, and coupled thereto for rotation, a set of impeller blades which are disposed within the discharge region to receive drive fluid from static nozzle means arranged to eject the fluid from the base or housing cover to impinge directly on them and generate a rotation force.

Notwithstanding the mechanism by which the fluid drives the rotor and its contaminant container at high speed, the back-flushed liquid which is passed through the contaminant chamber may exit the chamber and the rotor by other than the reaction nozzle means of the type conventionally used for centrifugally cleaned fluid to self-power the rotation, as the drive fluid provides sufficient reaction to maintain rotor speed; the liquid may for instance exit via slots or large diameter holes anywhere in the base of the rotor, possibly in line with the lower end of the stand tube 42 or where the reaction nozzle means 44 would normally be sited. Such nozzles, or their alternatives, may be dimensioned to provide a maximum pressure difference thereacross so that maximum pressure difference is available across the back-flushed filter region for optimum flushing of contaminants therefrom.

It will also be appreciated that whereas it is convenient for the drive fluid to comprise the liquid pumped through the system, and thus miscible with the cleaned liquid in the discharge region 29, it may comprise a fluid, liquid or gas, from a separate source.

The supply of fluid is required to be consistent to maintain the rotation momentum of the rotor such that any back-flushed liquid it receives is subjected to centrifugal separation of contaminants. To this end the supply of fluid need not be constant, but could vary in supply rate or pressure cyclically, possibly, pulse, such that it effects and maintains rotation of the rotor above a predetermined minimum speed to effect centrifugal cleaning.

If it is necessary to maintain segregation between the drive fluid and the back-flushed liquid, individual, radially separated, annular drainage regions may be defined in the base of the housing and the base of the rotor for the fluid and liquid and the reaction nozzle means arranged such that the cleaned, back-flushed liquid and the drive fluid exits into the different discharge regions.

Alternatively, a drive fluid immiscible with the back-flushed liquid may be discharged into a common discharge region but separated therefrom later, possibly by a further centrifugal device which separates fluids on the basis of their densities. The ambient pressure defined by the drainage region may be other than atmospheric pressure provided appropriate steps are taken to facilitate drainage.

Despite the numerous structural forms that such a separately fluid powered centrifugal cleaner may take, it will be seen from the specific embodiment described in detail that it is capable of being readily implemented by adaptation of a form of centrifugal cleaner self-powered by the liquid being cleaned, by adapting the reaction nozzles means, liquid inlet passage means along the spindle means to accommodate an auxiliary inlet passage, bearing tube to provide auxiliary rotatable fluid coupling into drive conduit means and additional reaction nozzle means to form the drive nozzle means, and furthermore by driving the rotor by reaction to the liquid of the system from which the back-flushed liquid is received.

The above description has been based on the back-flush arrangement being of the intermittent type, receiving liquid from discrete barrier filter elements with a reduction in flow at least during transition of the shield 23'. It will be appreciated that the back-flush arrangement may have a comparable shield or cover continuously and frequently exposing a varying, relatively small, region of an inlet surface not divided into discrete elements to such reverse flow of liquid from the outlet chamber.

I claim:

1. A liquid cleaning system comprising pump means operable to cause liquid to flow through the system, a barrier filter having a back-flush arrangement whereby a proportion of the liquid after passage through the barrier filter is passed in a reverse direction through a region of said barrier filter to create a back-flushed liquid: a fluid-powered centrifugal cleaner including a rotor having a contaminant chamber through which the back-flushed liquid is passed; and rotor drive means responsive to a supplied fluid, separate from the back-flushed liquid for effecting rotation of the rotor about a substantially vertical axis at at least a minimum speed required to effect centrifugal separation of solid contaminants from the back-flushed liquid passing through the contaminant chamber.

2. A liquid cleaning system as claimed in claim 1 in which the rotor drive means is arranged to receive and respond to drive fluid comprising pumped liquid of the system.

3. A liquid cleaning system comprising pump means operable to cause liquid to flow through the system, a barrier filter having a back-flush arrangement whereby a proportion of the liquid after passage through the barrier filter is passed in a reverse direction through a region of said barrier filter to create a back-flushed liquid; a fluid-powered centrifugal cleaner including a rotor having a contaminant chamber through which the back-flushed liquid is passed; and rotor drive means responsive to a supplied fluid, separate from the back-flushed liquid for effecting rotation of the rotor about a substantially vertical axis at at least a minimum speed required to effect centrifugal separation of solid contaminants from the back-flushed liquid passing through the contaminant chamber; and wherein the fluid-powered centrifugal cleaner comprises a housing having a base, defining a discharge region at ambient pressure, and spindle means, comprising a static spindle extending along an operably vertical axis through the housing, a bearing tube, carrying the rotor affixed thereto, journalled to the spindle and defining between axially spaced journals an annular tube space apertured to communicate with the contaminant chamber, and an axially extending main inlet passage formed in the spindle communicating with the annular tube space by way of main radial aperture means and arranged to receive said back-flushed liquid, and further wherein said fluid powered rotor drive means comprises a first part comprising an auxiliary inlet passage, extending along the spindle to receive therein said drive fluid separate from the back-flushed liquid, and auxiliary radial aperture means, spaced axially from the main radial aperture means, communicating with said bearing tube space, and a second part comprising rotor seal means, extending between the bearing tube and spindle at an axial position between the main and auxiliary radial aperture means to separate the tube space into discrete main and auxiliary regions, and a plurality of tangentially directed fluid reaction nozzles, and a plurality of drive conduits individually connecting said drive nozzles to the auxiliary region of the tube space to direct said drive fluid from the auxiliary inlet passage to the reaction nozzles.

4. A liquid cleaning system as claimed in claim 3 in which each drive nozzle is defined in a wall of the contaminant chamber.

5. A liquid cleaning system as claimed in claim 4 in which the rotor drive means comprises also at least one tangentially directed supplementary fluid reaction nozzle operable to pass back-flushed liquid from the contaminant chamber to the discharge region to produce a rotational force on the rotor related to liquid pressure within the container supplementing the force produced by the drive fluid, and wherein each said supplementary reaction nozzle is disposed adjacent a drive nozzle in said wall of the contaminant chamber.

6. A liquid cleaning system as claimed in claim 3 in which the fluid-driven centrifugal cleaner includes control valve means, operable to permit removal of the rotor contemporaneously with supply of back-flush liquid to the cleaner from the barrier filter.

7. A liquid cleaning system as claimed in claim 6 in which the control valve means comprises a drive fluid part, operable to impede or pass drive fluid to the first part of the rotor drive means, and a back-flushed liquid part operable, in conjunction with the drive fluid part impeding the flow of drive fluid, to divert the flow of back-flushed liquid from the main inlet passage to the discharge region.

8. A liquid cleaning system as claimed in claim 3 in which the fluid-driven centrifugal cleaner includes control valve means, operable to permit removal of the rotor contemporaneously with supply of back-flush liquid to the cleaner from the barrier filter, comprising a drive fluid part, operable to impede or pass drive fluid to the first part of the rotor drive means, and a back-flushed liquid part operable, in conjunction with the drive fluid part impeding the flow of drive fluid, to divert the flow of back-flushed liquid from the main inlet passage to the discharge region and the drive fluid part and back-flushed liquid part are defined by a single valve body extending through an aperture in the housing, to which aperture said drive fluid is supplied at one end of the valve body to be diverted laterally thereof to said first part of the rotor drive means or blocked by the valve body in dependence upon the position of the body in the aperture; and wherein said main inlet passage, discharge region and a back-flushed liquid duct are in communication with a different part of the valve body having a recess between it and the aperture, which recess is operable to connect either the main inlet passage or the discharge region with the back-flushed liquid duct in dependence upon the said position of the body in the aperture.

9. A liquid cleaning system as claimed in claim 8 in which the control valve means includes a cut-off valve comprising a piston, extending along a recess in the valve body and biased towards said one end of the valve body, responsive to drive fluid pressure below a predetermined minimal level to close the first part of the rotor drive means from the drive fluid source and responsive to drive fluid pressure in excess of said minimal level acting thereon at the end of the valve body to be displaced against the bias to admit the drive fluid to said first part of the rotor drive means.

* * * * *